CANNING

Filed Nov. 19, 1965

INVENTORS
Warren R. Schack
Jack M. Miller

ATTORNEYS

United States Patent Office | 3,476,574 | Patented Nov. 4, 1969

3,476,574

CANNING

Warren R. Schack, Western Springs, Ill., and Jack M. Miller, Shawnee Mission, Kans., assignors to Swift & Company, Chicago, Ill., a corporation of Illinois Filed Nov. 19, 1965, Ser. No. 508,649
Int. Cl. A23l 3/02
U.S. Cl. 99—214 5 Claims

ABSTRACT OF THE DISCLOSURE

In nonaseptic high temperature-short time sterilization and canning techniques where a food product is filled at sterilizing temperature level into a container and thereafter closed, cleaned, and passed into a temperature holding zone, the drop in temperature below the sterilization level which may result in in sufficient heat treatment being obtained in the holding zone is restored by rapidly heating the container to at least 5° F. above the filling temperature prior to entering the holding zone.

Figures 2, 3:
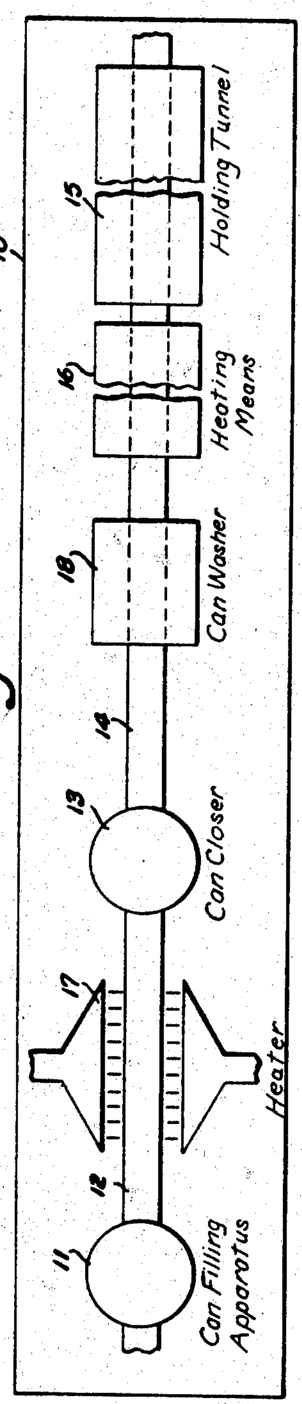

This invention relates to a high temperature-short time sterilization and nonaseptic canning techniques wherein food product at a high temperature is filled into containers and subsequently held for a period to complete sterilization requirements. More specifically, the present invention relates to an improved method and apparatus for restoring heat to the filled containers, which is otherwise lost by container radiation, absorption, and the like, between the filling operation and the holding operation for completing sterilization.

In copending U.S. Patent Nos. 3,241,475, issued Mar. 22, 1966 and 3,232,770, issued Feb. 1, 1966, (being respectively divisional and continuation-in-part applications stemming from abandoned application S.N. 78,628, filed Dec. 27, 1960), there is disclosed apparatus and method for so treating food product and nonaseptic filling of hot product of about 250° F. into relatively cool nonsterilized containers and thereafter holding the filled and closed containers for a period of time sufficient to complete the sterilization of the food and to also sterilize the containers. It is disclosed that the foregoing operations are conducted within a chamber, held at superatmospheric pressure, large enough to accommodate operating personnel to attend the processing equipment. In practicing the invention disclosed in the aforementioned patents, it was found that upon filling the product into containers, at least the peripheral portion of product adjacent the container walls rapidly declined in temperature to a significant degree. In fact, it appears that the product temperature adjacent the container wall may drop as much as about 20° F. in a very few seconds. Apparently this decrease is due to the product conducting heat outwardly to the relatively cool container wall, and also due to the outward radiation of heat from the product and container to the pressurized chamber environment which is maintained at normal room temperature for the comfort of personnel in attendance therein.

Also due to practical engineering considerations, it becomes necessary for the filled cans to traverse an exposed passageway between the filling and closing machines and the apparatus for holding the containers at substantially the filling temperature for completion of sterilization requirements. This traverse time is necessary to some extent to permit operators to visually inspect the product items, and to remove and straighten defective and misaligned items; and also to permit cleaning of the closed containers before they are exposed to an extended holding period at high temperature. Also, to accommodate the various pieces of apparatus it has been necessary, in one installation, as disclosed in the aforementioned patents, to conduct the containers from filler and closer apparatus at one level to a holding apparatus at another level within the pressurized chamber. Accordingly, as a practical matter, it has occurred that a time interval of about 15–60 seconds is required to move containers from the closing machine to the entrance of the temperature holding apparatus. The exact time varies somewhat with the rate at which containers are processed, which, in turn, is dependent upon the size of containers being filled.

However, during an interval beginning at the filler, a very significant temperature declines does occur in the enclosed product. This decline is highly significant because the lowest temperature existent in the product will determine the length of time that the enclosed product must be held to complete sterilization requirements. That is, longer terminal sterilization times are required as the temperature of product declines. Simultaneously, heat deterioration of the product may also occur where the terminal processing must be lengthened. Thus, it is important to both good quality and sterilization to maintain a high product temperature level for a relatively briefer time during the holding period. The maximum practical temperature during this period is the product filling temperature because it will exist at the center of the product even if great quantities of heat are applied externally of the can immediately after filling. Therefore, the length of the terminal sterilization period may be based upon the lowest temperature of the product, which cannot exceed the filling temperature.

Accordingly, it is an object of the present invention to minimize and restore heat loss from filled product by conduction and radiation immediately following the filling operation.

It is another object of the present invention to restore and raise the temperature of product and container to about the initial filling temperature within a brief period following the filling operation.

Basically the present invention involves a rapid application of heat to the filled container at a point in its path between the filling operation and a temperature holding operation at a point closely adjacent the latter operation so as to avoid a subsequent and further decline in temperature, and preferably such heat is applied by raising the container surface to a temperature above the filling temperature so as to induce an inward penetration of heat.

Basic apparatus for performing the method of the present invention comprises a heating means positioned between filling apparatus and a holding apparatus, preferably adjacent the latter, capable of directly applying heat to the container wall and preferably at a temperature in excess of the filling temperature level so as to induce an inward penetration of heat through the container wall into the adjacent portions of food product.

Further objects and advantages of the present invention will become apparent from the following description taken in conjunction with the accompanying drawings showing an apparatus of the present invention and wherein:

FIGURE 1 shows a schematic view of the various elements of the apparatus,

FIGURE 2 is a longitudinal sectional view of one form of heater that may be used in the apparatus, the section being taken on the line 2—2 of figures 3, and FIGURE 3 is a cdoss sectional view through the heater on the line 3—3 of FIGURE 2.

According to the high temperature-short time sterilizing and filling technique to which the present invention applies, food product is heated to a temperature level that is lethal to microorganisms and then filled, while hot, into containers. Preferably the lethal temperature level is well above the normal atmospheric boiling point and within a range of about 230°–270° F. To do this, the heating and filling must be conducted under superatmospheric pressures. A highly practical pressure level at filling is about 18 p.s.i.g. which will enable filling temperatures of up to about 255° F. to be maintained; and which pressure may be tolerated for long periods by human personnel without ill effect. For human comfort, however, the pressurized environment must be conditioned to a normal temperature of about 72°–78° F. Also, in practice the actual filling temperature will be somewhat lower than the maximum possible temperature, usually about 250° F.

Consequently, the food product upon being filled into containers will be immediately cooled, at least adjacent the container surfaces, due to the empty container being at the ambient room temperature and also due to outward radiation to the much cooler room. The filled container must thereafter be closed, and normally progresses a given distance of a few feet to a closing apparatus. During this travel the product temperature will decline further. Following closing, it may be desirable to clean the closed container surface by washing, or the like, and thence it must be conveyed some distance further to a suitable holding zone, such as a heated tunnel or the like, to maintain the product temperature from further decline. According to the present invention the container surfaces and adjacent portions of food product are reheated at least just prior to entering the holding zone so as to restore the temperature level of the food product and container substantially to the filling condition. This is done by applying heat energy sufficient to raise the container surface temperature to a level at least slightly in excess of the filling temperature.

Preferably this is done just in advance of the entrance to the holding zone, which is normally within 60 seconds after filling, so that no further opportunity for temperature decline will occur. A number of suitable methods of heat application may be utilized. For instance, a high level of radiant heat energy may be directed upon the container surfaces by known radiant heat sources such as infra-red lamps, electric and/or gas heated radiant panels and the like.

To be effective, any heating means should be capable of delivering sufficient heat to the surface of the containers to raise the body and end wall temperatures at least about 5° F. above the filling temperature level without localized excesses of heat. This will insure inward transfer of heat to the product within the container. With radiant heating it is possible to reach surface temperatures of about 300° F. within about 10 seconds.

Another suitable method of rapid heating is by direct application of a hot fluid. Preferably the containers are run through an enclosure wherein they are immersed in or exposed to sprays of hot fluid just prior to reaching the holding tunnel. Superheated steam at a temperature in the range of 250–450° F. is preferred. An elevated pressure of approximately 18 p.s.i.g. would provide a normal steam temperature in the order of 255° F. which can be elevated further by adding heat to the steam in vapor phase. Also, since the boiling point of water at such elevated pressure is about 255° F., a bath or sprays of water at between 250–255° F. would be practical. Steam and/or a heated liquid are preferred over other gases due to the higher rate of heat transfer provided by the former.

In the prior applications it has been suggested that filled and closed cans may be washed with water heated to near the filling temperature at a position closely adjacent to the closing machine. However, in practice it has been found that the water temperature and brief period of contact sufficient for washing were not sufficient to restore the product temperature, nor was it in sufficiently close proximity to the holding means to avoid a further decline in product temperature.

The aforementioned use of radiant heat located adjacent the container path near the entry to the holding means is a preferred mode of heating. While an enclosure is not absolutely necessary where radiant heat is employed, it is desired so as to concentrate the supply of heat onto the product and also to reduce the radiation from the product to the chamber environment which would otherwise continue.

While it is essential that rapid heating of the containers and product be continued up to the entrance of the holding tunnel, the heating may be initiated at any point downstream of the filling machine but preferably following the closing machine so as to permit access, if needed, to the unclosed cans and to the closed cans immediately after sealing. Since radiant heating can be accomplished without an enclosure, and therefore can be initiated just following the filling operation, it is a preferred form of heating either alone or in combination with subsequent fluid heating means. It will be understood, however, that steam heating could be initiated within an enclosure between the filling and closing apparatus.

Referring to the drawings, 10 designates a pressurized chamber in which a filling apparatus 11 receives a continuous supply of food product from a heater (not shown) and a continuous supply of cans from a can cleaner (not shown). The cans are filled in succession in the filling apparatus 11 and are then passed on a conveyor 12 to a closing machine 13 wherein lids are applied and sealed to each successive can. From the closer 13 the cans are continuously advanced along a further conveyor 14 to a holding tunnel generally 15. A heating means 16 is maintained just in advance of the holding tunnel 15; and additional radiant heating means 17 may be positioned in advance of the enclosure 16 as is shown adjacent the conveyor 12 between filler 11 and closer 13. Where a can washer 18 is included in addition to or as part of the rapid heating means, it is located relatively close downstream of the closer 13 and in advance of the major portion of the heating means 16, so as to remove any spillage or the like from the closed cans before such could be baked and dried upon the surface thereof.

As one example of heating means, it may include an elongated housing 19, which in the illustrated instance is wide enough to pass a plurality of rows of containers across the width thereof and to contain longitudinally arranged heater elements 20. The housing 19 includes side walls 21 and 22, a top wall 23, and end walls 24, and bottom 25. The walls of the housing preferably are formed of inner and outer sheets 26 and 27, to contain an insulating material 28 therebetween. The inner surfaces 29 of the inner sheets 26 are highly polished or coated with a heat reflecting material. The end walls 24 have openings 30 to pass the rows of containers into the housing and to pass the containers therefrom. Suitably carried within the housing are spaced apart guide rails 31 and 32 at the respective sides of the openings 30, to guide the containers in orderly arrangement between longitudinally disposed heating elements 20, which may be suitably supported in the housing in spaced relation with the containers by brackets 33.

The heating elements in the illustrated instance are elongated "Chromalox" units or "Calrod" units, since such units are infrared and may be used in a small housing and allow room therebetween for passage of the containers. The units 20 are preferably disposed so that two or more units are located between the reflecting surfaces of the side walls and the outer rows of containers. Similar units 20 are disposed between each row of containers. Also, a heating unit 34 is disposed along the top row of each container pass, and a similar unit 35 is disposed under each container pass, as clearly shown in FIG. 3.

Sterilization is a function of temperature and time, therefore, sufficient heating units are provided, the housing is of a length, and the containers are carried therethrough at a speed to get the necessary heat into the containers without causing buckling of the containers or damaging the product therein.

The containers are carried through the passes between the guides by a conveying means 36, which may comprise an endless belt operating over pulleys 37 and 38 at the respective ends of the housing. One of the pulley shafts may be equipped with a sprocket or other driving connection 30, so that the containers are conveyed through the length of the heater at the proper speed. The heater thus described may be suitable supported in proper elevation with respect to the discharge of the can washer 18 and the inlet of the holder 15 on legs 40.

It is obvious that some of the radiant heat from the heating elements is directed directly to the sides of the containers, while others of the radiant heat is reflected back to the containers from the reflecting surfaces of the housing.

Obviously many modifications and variations of the invention as hereinbefore set forth may be made without departing from the spirit and scope thereof, and, therefore, only such limitations should be imposed as are indicated in the appended claims.

We claim:

1. In a high temperature-short time food sterilization and nonaseptic filling process wherein food product is heated to temperatures in excess of the normal atmospheric boiling point, filled under nonaseptic conditions into containers at a filling temperature within the range of about 230–270° F. and within a chamber held at superatmospheric pressure and maintained at about normal room temperature, closed within the container, and shortly thereafter held at about the filling temperature within a holding zone for a further period sufficient to adequately complete sterilization of the container and product including any contamination introduced at filling, the improvement in said process comprising: rapidly heating the filled container walls to at least 5° F. above the filling temperature without localized excesses of heat and at least the portion of product adjacent the container walls, said rapid heating being initiated within about 60 seconds after filling of said container and prior to the beginning of said further period for holding so as to restore heat lost from the product during and subsequent to filling by conduction to the relatively cool container walls and by radiation to the surrounding environment, and to thereby raise and return the temperature of the container and said adjacent product to about the filling temperature by the time the filled and closed container enters said holding zone to complete sterilization, whereby the time period required for final sterilization of the product and container within the holding zone is reduced.

2. The improved process of claim 1 wherein the product filling temperature is about 250° F.

3. The improved process of claim 1 wherein the filled containers are rapidly heated by the direct application thereto of a fluid maintained at a temperature level sufficient to raise the temperature of the container walls to at least 5° F. above the filling temperature without localized excesses of heat.

4. The improved process of claim 1 wherein the filled containers are rapidly heated by radiant energy to a surface temperature of at least 5° F. above the filling temperature without localized excesses of heat.

5. In an apparatus for high temperature-short time sterilizing and nonaseptic filling of food product into containers at a product filling temperature lethal to microorganisms, including product heating means, filling and closing means within a chamber held at superatmospheric pressure and maintained at about room temperature and large enough to accommodate operating personnel, and holding means for maintaining the filled and closed containers at about the filling temperature for a period adequate to complete sterilization of the container and product including any contamination introduced at filling, the improvement in said apparatus comprising: a container heating means positioned between said filling means and said holding means, said container heating means including a plurality of radiant heaters arranged about and along the pathway of said container between said filling means and said holding means, said heating means being provided for rapidly restoring heat lost from the filled product by conduction to the relatively cool container walls and by radiation to the surrounding environment, and to thereby raise and return the temperature of the container walls and adjacent product to about the filling temperature by the time the filled and closed container enters said holding means.

References Cited

UNITED STATES PATENTS

| | | | |
|---|---|---|---|
| 2,816,841 | 12/1957 | Kaap | 99—214 |
| 2,817,593 | 12/1957 | Peebles | 99—214 |
| 3,092,503 | 6/1963 | Gray | 99—217 |
| 3,241,475 | 3/1966 | Schack et al. | 99—249 |

RAYMOND N. JONES, Primary Examiner

STEPHEN B. DAVIS, Assistant Examiner

U.S. Cl. X.R.

99—182, 249, 360